United States Patent
Daub

[11] Patent Number: 5,931,616
[45] Date of Patent: Aug. 3, 1999

[54] METHOD AND APPARATUS FOR PRODUCING UNDERCUT GROOVES

[76] Inventor: Jürgen Daub, Coburgstrasse 11, D-72108 Rottenburg, Germany

[21] Appl. No.: 08/803,389

[22] Filed: Feb. 20, 1997

[30] Foreign Application Priority Data

Mar. 22, 1996 [DE] Germany .................. 196 11 276

[51] Int. Cl.$^6$ ........................................... B23C 1/30
[52] U.S. Cl. ..................... 409/132; 407/34; 408/227
[58] Field of Search ................................ 409/131, 132, 409/137, 144, 234; 407/34, 42, 53, 61; 408/1 R, 199, 204, 206, 223, 224, 227

[56] References Cited

U.S. PATENT DOCUMENTS

| | | | |
|---|---|---|---|
| 2,645,003 | 7/1953 | Thompson et al. | 407/46 |
| 3,018,675 | 1/1962 | Klages et al. | 407/107 |
| 3,540,103 | 11/1970 | Saari | 407/46 |
| 4,182,587 | 1/1980 | Streigl | 407/61 |
| 4,303,358 | 12/1981 | Grusa | 408/223 |
| 4,335,983 | 6/1982 | Wermeister et al. | 407/41 |
| 4,500,234 | 2/1985 | Orth et al. | 408/206 |
| 4,610,581 | 9/1986 | Heinlein | 409/132 |
| 4,927,303 | 5/1990 | Tsujimura et al. | 408/223 |
| 4,964,762 | 10/1990 | Arai et al. | 407/34 |
| 5,244,318 | 9/1993 | Arai et al. | 407/42 |
| 5,430,936 | 7/1995 | Yazdik et al. | |

FOREIGN PATENT DOCUMENTS

| | | |
|---|---|---|
| 0 700 744A1 | 3/1996 | European Pat. Off. . |
| 2 270 045 | 5/1974 | France . |
| 2 270 045 | 5/1975 | France . |
| 196 07 230 C1 | 2/1997 | Germany . |

OTHER PUBLICATIONS

Schulte "Numerisch gesteuertes Rotornut–Fräsen" ("Numerically controlled milling of rotor grooves") VDI–Z., vol. 126, No. 5, Mar. 1984. Dusseldorf, Germany, pp. 128–131.

"Methoden und Maschinen zur Fräsbearbeitung von Generator–und Turbinenrotoren" (Methods and Machines for Milling Generator and Turbine Rotors), Ing. (grad.) Siegfried Neumann, Special Publication No. 9 of Köllmann Maschinenbau GmbH, 5602 Langenberg/Rhld. (1969).

*Primary Examiner*—Andrea L. Pitts
*Assistant Examiner*—Adesh Bhargava
*Attorney, Agent, or Firm*—Frishauf, Holtz, Goodman, Langer & Chick, P.C.

[57] ABSTRACT

In the production of rotor grooves, between the usual undercut-free opening of the groove with a disk milling cutter and profile milling by means of a high speed, high performance steel profile shaft milling cutter, a preliminary fine cutting operation is inserted, in which the profile form is premachined with a profile shaft milling cutter equipped with indexable cutting bits. The profile shaft milling cutter used for the purpose has a greater number of cutting surfaces at its tooth tips than at its tooth flanks. The cutting surfaces defined by overlapping, in circumferential direction, of the cutting edges of the indexable cutting bits are interrupted, so that substantially flat and hardly stiff chips are produced.

27 Claims, 6 Drawing Sheets

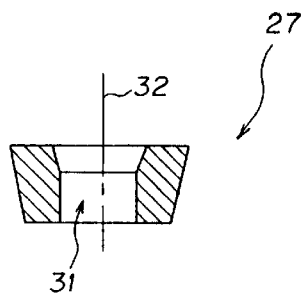
FIG. 3
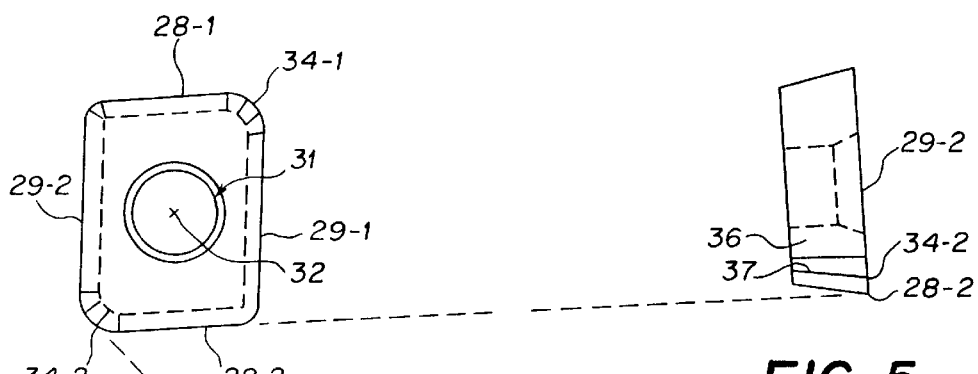
FIG. 4
FIG. 5
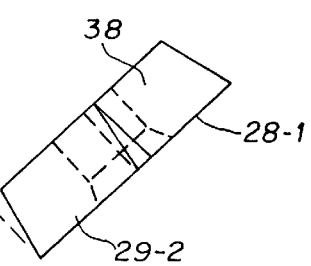
FIG. 6

METHOD AND APPARATUS FOR PRODUCING UNDERCUT GROOVES

Cross reference to related patent and application, the disclosures of which are hereby incorporated by reference: U.S. application Ser. No. 08/803,386, filed Feb. 20, 1997 DEISS, assigned to the Assignee of this application; U.S. Pat. No. 5,430,936, Yazdik et al.

FIELD OF THE INVENTION

The invention relates to an apparatus and a method for producing undercut grooves, especially for producing straight and oblique grooves of stepped shape, which will be termed fir-tree, or "Christmas-tree" shape, for securing blades to turbine rotors or the like.

BACKGROUND

Turbine rotors usually have a cylindrical base body which is provided with a plurality of disklike, radially outwardly protruding portions forming blade carrier portions. These portions are disposed coaxially with the remainder of the cylindrical turbine rotor and are provided along their circumference with a number of profiled grooves extending axially or obliquely to the axial direction. The grooves secure a suitably shaped blade root; to avoid local overloads and to assure precise mounting of the respective turbine blade, they must be manufactured to precise dimensions, that is, with only a slight tolerance of 0.01 mm, for instance.

The grooves are typically produced in a milling process, of the kind described in Köllmann: "Methoden und Maschinen zur Fräsbearbeitung von Generator- und Turbinenrotoren" [Methods and Machines for Milling Generator and Turbine Rotors], Publication No. 9, Köllmann Maschinenbau GmbH, 5602 Langenberg/Rheinland, Federal Republic of Germany. The appropriate blank is supported on a chucking and indexing attachment that serves to position the blank for milling of the individual grooves. Producing a groove involves multiple machining steps. In a first such machining step, the groove is cut with a disk milling cutter in a rough milling operation. This forms an undercut-free contour that is only roughly like the later or, in other words, desired groove form.

A disk milling cutter is guided through the workpiece in a feeding motion longitudinally of the groove to be cut, i.e. opened. In a second machining step, which is a step of final machining of straight or oblique grooves, a high speed, high performance steel (HSS) shaft, or shaped, milling cutter is guided with maximum precision longitudinally through the groove, in order to form the desired fir-tree-shaped groove with a dimensional error of less than 0.01 mm. In this milling machining step, on the sides of the rough-machined (pre-cut) groove, longitudinally extending undercuts are made that produce the typical fir-tree profile in cross section.

The feed of the HSS shaped milling cutter is effected in the longitudinal direction, and a relatively large amount of material must be removed, especially in the undercut regions to be formed. The attainable feed speed is intrinsically limited; values between 40 and 80 mm per minute are attained. Conversely, a certain minimum machining time for each individual groove cannot be undershot. Given the large number of grooves to be formed on the circumference of the turbine rotor, the total machining time of the turbine rotor is considerable, and this results in high cost.

Another set of problems arises in conjunction with the HSS shaft milling cutters. Their ground surface determines the attainable accuracy of the grooves in shaped milling. This means that a HSS shaft milling cutter has to be reground, before wear causes it to exhibit a pronounced dimensional deviation. A relatively large inventory of tools is therefore necessary to assure that sufficiently sharp and at least approximately dimensionally accurate tools are available at all times in the milling process, while worn-down HSS shaft milling cutters are being reground in the suitably arranging grinding facility. Moreover, in the regrinding, which is done at the chip faces, a dimensional deviation of the milling cutter is produced because of the acute-angle placement of the flanks to the circumferential direction.

THE INVENTION

On the basis of the first set of problems discussed above, the object of the invention is to create a workpiece material removal tool for producing undercut grooves and a method for efficiently making such grooves, which make it possible to shorten the machining time. It is furthermore an object of the invention to create a workpiece material removal tool and a method for removing material that provide for longer service life of the workpiece material removal tool.

Briefly, in the production of rotor grooves, between the usual undercut-free opening of the groove with a disk milling cutter and profile milling by means of a high speed, high performance steel (HSS) profile shaft milling cutter, a preliminary fine cutting operation is inserted, in which the profile form is premachined with a profile shaft milling cutter equipped with indexable cutting bits.

The profile shaft milling cutter is a workpiece material removal tool whose cutting edges, depending on the direction in which they are located, define different numbers of cutting edges. For instance, on its circumference, the workpiece material removal tool has cutting edges that are oriented parallel to the axis of rotation that coincides with the longitudinal center axis. In the profile shaft milling cutter for machining out a groove of fir-tree profile, these cutting edges are relatively short, each at its tooth tips. These cutting edges are oriented at right angles to the feed direction, which is oriented radially to the axis of rotation, i.e. the longitudinal center axis of the tool body. Cutting edges adjoining the tooth tips form an acute angle both with the axis of rotation and with the feed direction. The cutting edges are present at each tooth tip and oriented parallel to the longitudinal center axis or axis of rotation, i.e. at right angles to the feed direction. They define a number of cutting edges that is greater than the number of cutting edges defined by the obliquely oriented cutting edges. Referred to the axis of rotation, this means that the number of cutting edges forming a small angle, typically an acute angle, which may also be zero with the axis of rotation is greater than the number of cutting edges that form a comparatively larger angle with the axis of rotation. In terms of the feed direction, every cutting edge located at a right angle or at a relatively large acute angle to the feed direction defines a higher number of cutting edges than each cutting edge that forms a quantitatively smaller acute angle with the feed direction.

The result attained with this arrangement is that the chip thickness as are approximately of equal size at all the cutting edges. It is thus possible to increase the feed speed because of the increased number, compared with the usual number of cutting edges oriented at right angles, or at slightly other than a right angle, to the feed direction. In the final analysis, the result is a shortening of the machining time for a single groove, which because of the large number of grooves in turbine rotors adds up to a considerable overall time savings compared with conventional machining methods. For instance, if the obliquely located cutting edges are at an angle of about 45° from the axis of rotation, and if the number of cutting edges in the pointed region of the teeth is $z=2$ and in the remaining region is $z=1$, then in comparison with a tool having a single cutting edge ($z=1$), twice the feed speed can be employed, resulting in a time savings of 50%.

Some tools can be used with the feed direction parallel to the axis of rotation.

In a preferred advantageous embodiment, the tool body is provided with cutting bits or plates, or inserts. These are preferably indexable and/or reversible cutting bits, which are connected separably, to the tool body. Indexable cutting bits make a high material removal performance possible and thus make a very high feed speed possible in comparison with HSS shaped milling cutters. Worn, bits or inserts, or plates can be replaced or turned, so that the dimensional accuracy of the applicable workpiece material removal tool can be easily assured. It is especially advantageous to separate the interaction of cuts of the various cutting bits, or plates. This means that on each indexable cutting bit or plate, only one main cutting edge and the adjacent cutting edge, which are located at the tooth tip, are active. The overlap of cutting edges in the circumferential direction of indexable cutting bits located one after the other results in one complete cutting surface in the side region and two cutting surfaces in the tooth tip region. Because the chips produced with such an arrangement in the material removal are cut primarily from the preferably straight main cutting edge and the short, adjoining cutting edge next to it, they are substantially flat and hence flexible. This contributes to good chip guidance.

In a workpiece material removal tool of the aforementioned design, the plate seats on the tool body are preferably arranged in a spiral or helical line. The effect attained is that in the material removal operation the indexable cutting bits do not come into engagement with the workpiece simultaneously but rather in succession, which makes smooth machining or in other words a gentle cutting process possible.

The chip spaces of individual indexable cutting bits are separated from one another. As a result, the chips are lifted away off the workpiece and are guided separately and cannot catch on one another or interfere with one another.

Reinforcement ribs can be formed on the tool body between the chip spaces and serve to separate the chip spaces and reinforce the tool body. This makes it possible to attain increased machining accuracy.

In the method for producing undercut grooves, in accordance with a feature of the invention, besides the machining steps known from the prior art, namely the opening of the groove and fine-cutting of the groove, one additional machining step is performed, which is done between the rough cutting, or opening of the groove and the finish-cutting. This additional step is a preliminary fine cutting of the groove in which the desired groove is formed with a constant undersize or oversize, respectively. In the last fine cutting or finish machining operation, a uniform depth of material is then to be removed, which reduces tool wear and makes it of uniform extent over the entire length of the cutting surfaces of the fine cutting machining tool. The surface life of the fine cutting machining tool is thus improved. Moreover, the feed speed can be increased, because only a slight amount of material now needs to be removed in the finish cutting operation, and thus the machining time can be reduced markedly.

The preliminary fine cutting step is preferably done with a profile shaft milling cutter equipped with indexable cutting bits. This makes a high feed speed possible, because of the high material removal performance that is attainable with indexable cutting bits.

Drawings

One exemplary embodiment of the invention is shown in the drawings.

Figure 1:
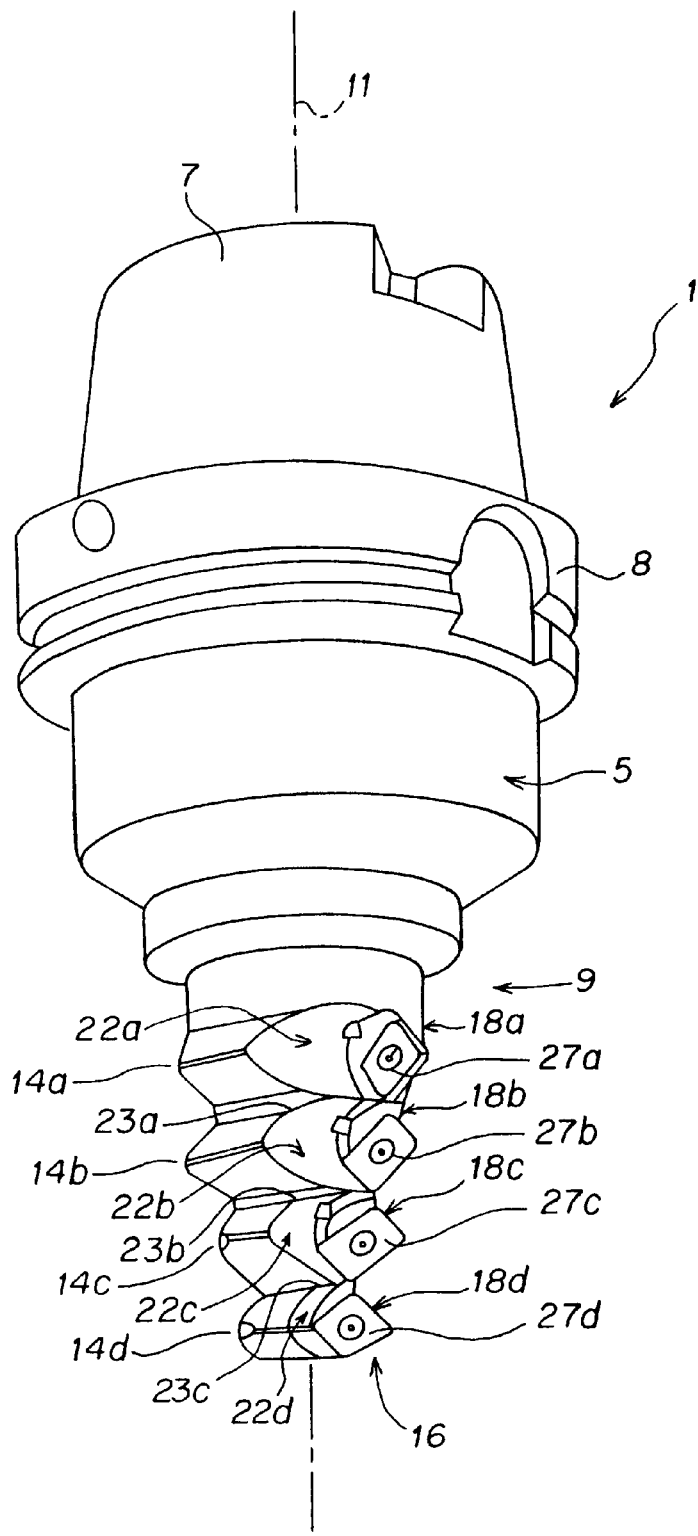
FIG. 1 is a perspective view of a shaft milling cutter for preliminary fine cutting of profile grooves.
Figure 2:
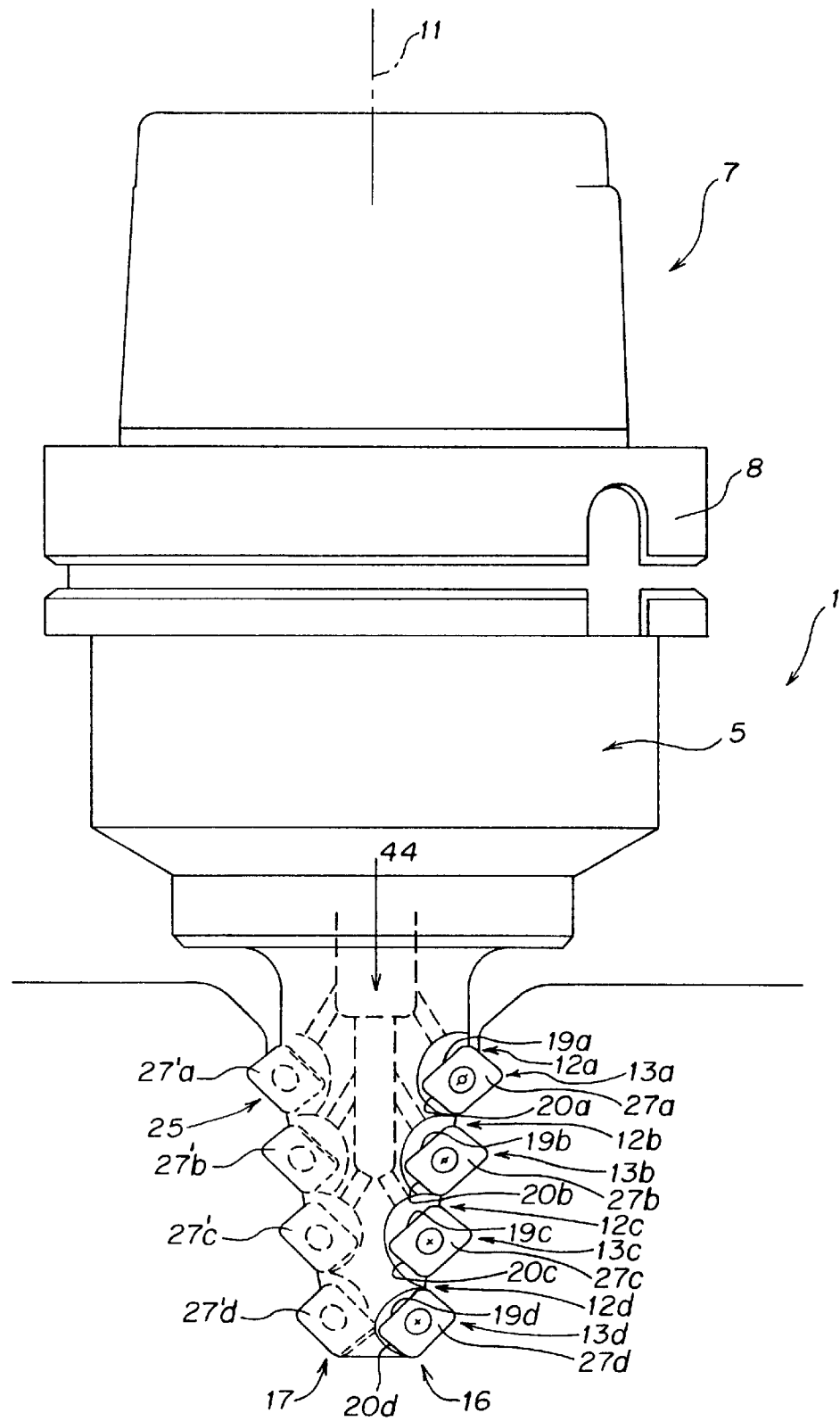
FIG. 2 is a schematic side view, on a different scale, of the profile shaft milling cutter of FIG. 1, with indexable cutting bits engaging a workpiece.
Figures 7, 7A:
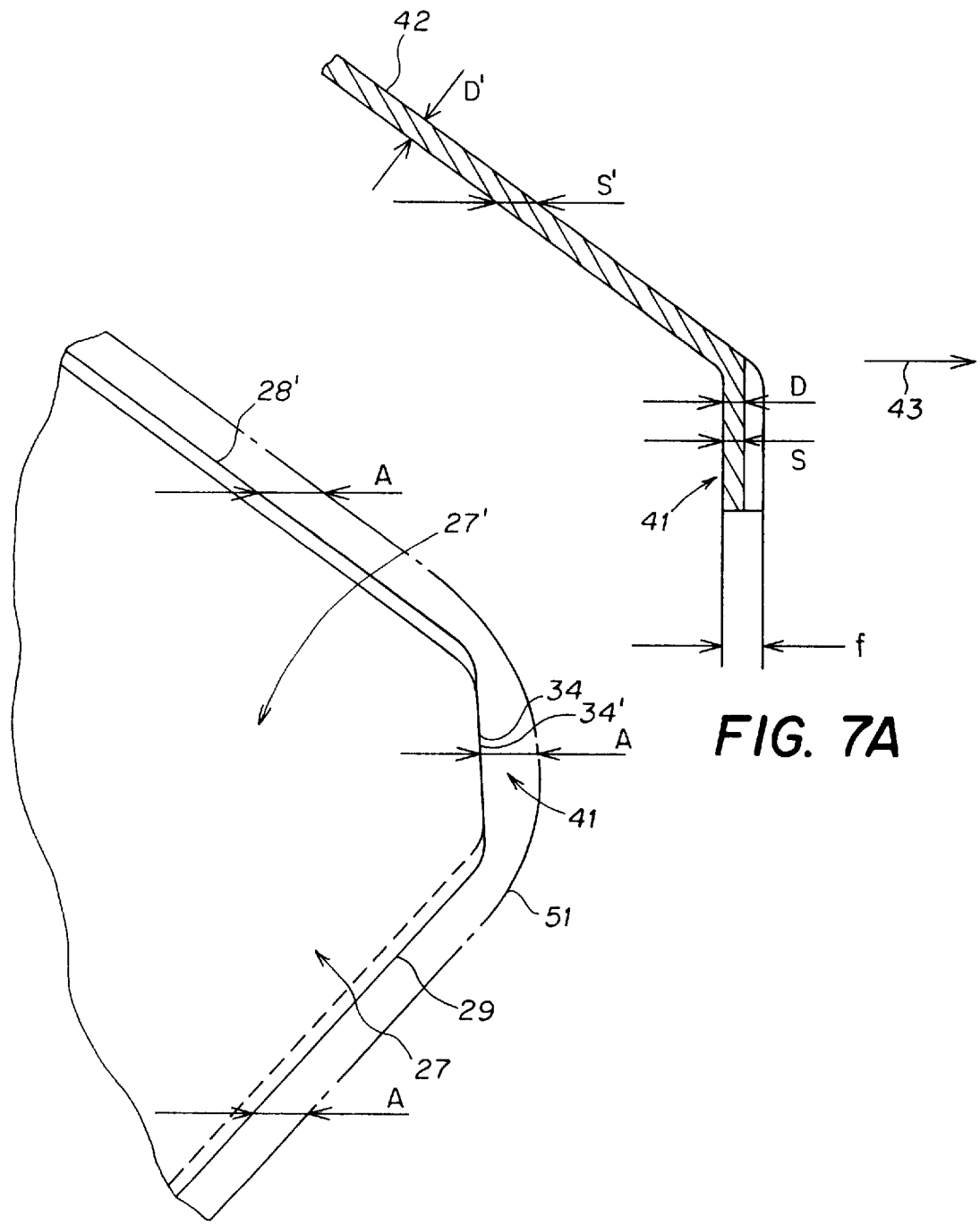
Figure 9:
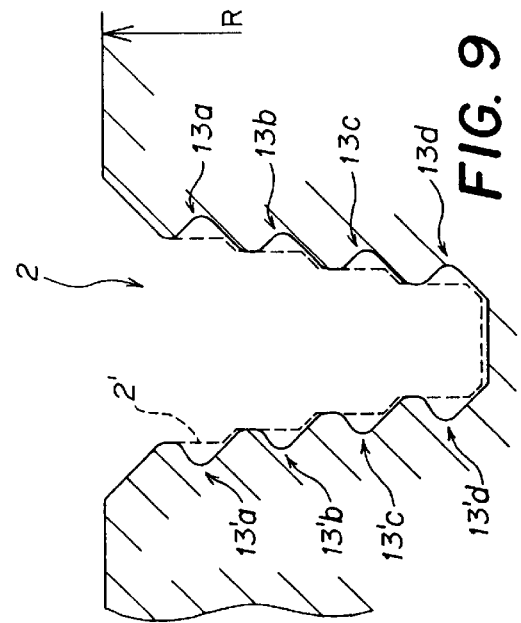
Figure 8:
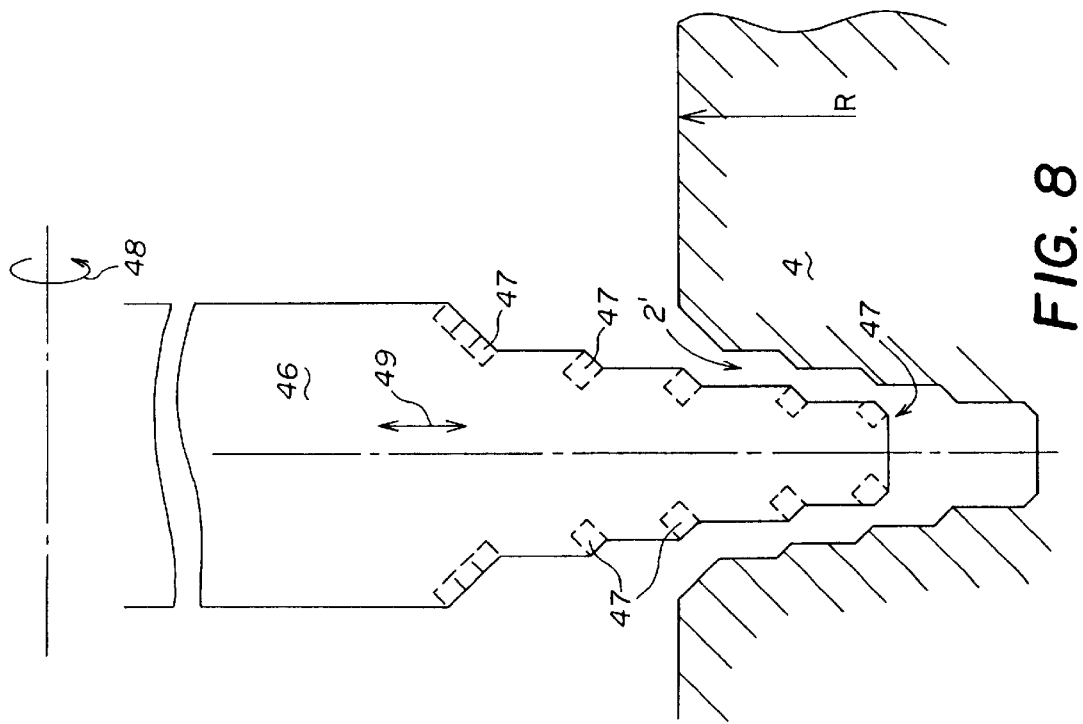
Figure 10:
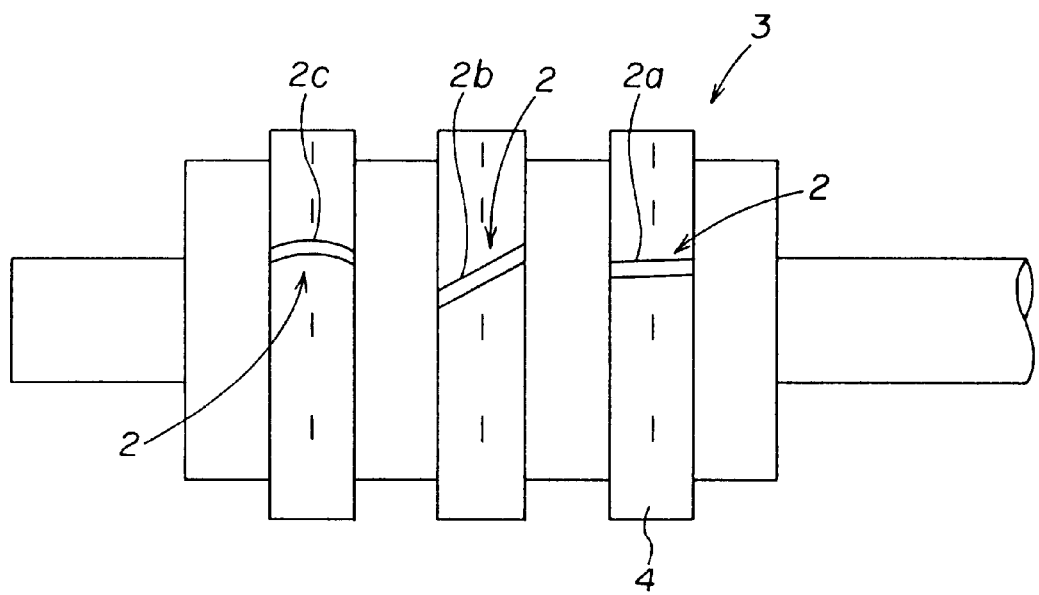

FIG. 3, in a sectional view on a different scale, shows an indexable cutting bit of the profile shaft milling cutter of FIGS. 1 and 2;

FIG. 4 is a plan view of the indexable cutting bit of FIG. 3;

FIGS. 5 and 6 are side views, looking to the respective flanks, of the indexable cutting bit of FIG. 4;

FIG. 7 is a schematic view, on a larger scale, of two cooperating indexable cutting bits in their tooth tip region, projected onto one another in the circumferential direction, showing their geometrical relationship with one another and with respect to the desired groove profile;

FIG. 7A is a schematic cross-sectional view of a chip produced by the profile shaft milling cutter of FIGS. 1 and 2, illustrating the geometrical relationships of the cutting edge of FIG. 7;

FIG. 8 is a schematic view of a workpiece with a groove that has been opened by a disk milling cutter and is a rough contour, without undercuts, of the groove that is to be produced;

FIG. 9 schematically shows the workpiece of FIG. 8 after a preliminary fine cutting operation, following the opening of the groove, has been performed; and FIG. 10, in a schematic illustration on a smaller scale, shows a turbine rotor with flangelike cylindrical portions on which grooves that have undercuts are formed.

DETAILED DESCRIPTION

FIG. 1 shows a workpiece material removal tool, in the form of a profile shaft milling cutter 1, of the kind to be used for preliminary fine cutting of undercut grooves 2 (FIGS. 9 and 10). The grooves 2 (collectively) are securing grooves for turbine blades of a turbine rotor 3, especially for steam turbines. The grooves 2 are provided on cylindrical portions 4 of the turbine rotor 3 which protrude in the radial direction beyond the remainder of the turbine rotor 3, so that each of the grooves 2 are open on both ends. FIG. 10 shows a straight groove 2a, an inclined groove 2b and an arcuate groove 2c.

As shown in FIG. 1, the profile shaft milling cutter 1 has a tool body 5, which beginning with a cylindrical basic shape is provided with a cone on one end, the upper end in FIG. 1, having a taper 7 for retention in a tool or spindle holding fixture. The taper 7 is preferably formed as a hollow-shank taper or quick-release, steep taper. The taper 7 is adjoined by a substantially cylindrical handling portion 8 provided with a circumferential groove and from which a profiled indexable insert carrier portion 9 extends. Like the other portions 7, 8 of the tool body 5, the indexable insert carrier portion 9 is coaxial with a longitudinal center axis 11, which in use of the profile shaft milling cutter 1 coincides with its axis of rotation.

The indexable insert carrier portion 9 has an outer contour that, except for a certain undersize, substantially coincides in longitudinal section with the cross section of the groove to be produced. In the case of the groove 2, visible in FIG. 2, to be produced in the example and having the fir-tree profile, which has ribs 12 shown separately at 12a–12d on its groove sides 4 that protrude into the groove interior and extend longitudinally of the groove, with intervening longitudinally extending indentations 13 (13a–13d). The indexable insert carrier portion 9 has a total of four axially spaced-apart and circumferentially extending radial protrusions or circumferentially extending annular beads 14 (FIG. 1) (14a–14d), beginning at a frustoconical basic shape. Each annular bead 14 forms one portion that is used to machine out one of the indentations 13. To that end, the indexable insert carrier portion 9 is provided with two rows 16, 17 of indexable inserts, each row being arranged on a spiral of appropriate pitch.

The indexable insert row 16 includes a total of four plate seats 18 (18a–18d). One plate seat 18 (18a–18d) is located at each annular bead 14, interrupting the annular beads 14(a–d). Each plate seat 18 is provided with a radially and axially oriented bearing face, which is adjoined by two contact faces 19, 20(a–d) that are at an angle from one another and from the bearing face. Moreover, as can be seen from FIG. 1, one recess 22 (22a–22d), located to the front in the rotational direction of the profile shaft milling cutter 1 and interrupting the bead 14, is associated with each plate seat 18 and acts as a chip space. The recesses 22a–22d are separated from one another by ribs or lands 23 (23a–23c), which prevent a chip from migrating from one chip space to the next and which also reinforce the profile shaft milling cutter 1 and its indexable insert carrier portion 9.

The indexable insert row 17 is linearly symmetrical to the indexable insert row 16 with respect to the longitudinal center axis 11, and the description of the indexable insert row 16 thus applies accordingly to the indexable insert row 17. Associated with each plate seat 18 (18a–18d) is one plate seat 25 of the indexable insert row 17, forming pairs. Indexable cutting bits 27 (27a–27d), 27' (27'a–27'd), as seen in FIGS. 3–6, that match one another are held on the plate seat 18 and on the plate seat 25, whose precise design will be described later herein.

As shown in FIG. 4, the indexable cutting bit 27 has a total of four main cutting edges 28-1, 28-2, 29-1, 29-2, arranged along the sides of a parallelogram. The indexable cutting bit 27 is also linearly symmetrical to a straight line 32 that defines the center axis of an attachment opening 31. References below to main cutting edges 28, 29 will in each case apply to both main cutting edges, that is, both to 28-1, 28-2 and to 29-1 and 29-2.

In the corner region enclosed between the main cutting edges 28, 29, the main cutting edges 28, 29 merge via a rounded corner with a short, straight corner cutting edge 34 (34-1, 34-2). A continuous chip face visible in plan view in FIG. 4 is adjoined, as seen in FIGS. 5 and 6, by flanks 36, 37, 38 which are at an acute angle to the chip face and are oriented such that the clearance angles formed on the profile shaft milling cutter 1 are all positive.

An embodiment of each two circumferentially overlapping plate seats 18, 25, and in particular both their radial and their axial orientation relative to one another, can be seen in FIG. 7. This applies equally to each pair of plate seats 18a, 25a; 18b, 25b; 18c, 25c; 18d, 25d. While the plate seats 18, 25 face one another diametrically in pairs, the support surfaces 19, 20 (FIG. 2) are positioned in the axial direction such that the indexable cutting bits 27, 27' are offset axially from one another by an amount that is in the range of a tenth of a millimeter.

FIG. 7 shows the indexable cutting bits 27, 27' projected onto one another in the circumferential direction. The axial offset is defined such that both indexable cutting bits 27, 27' are each active only with one main cutting edge 28', 29 and with their corner cutting edges 34', 34. The overlap of the indexable cutting bits 27, 27' is therefore defined such that both indexable cutting bits 27, 27' together define one cutting edge for the flank regions of the indentation 13 and one double cutting edge in the tooth tip region 41. The number z of cutting edges in the region of the main cutting edge 28', 29 located obliquely to the longitudinal center axis 11 (FIG. 1) is therefore one, while the number z of cutting edges in the region of the corner cutting edge 34', 34 located parallel to the longitudinal center axis 11 is two. The number of cutting edges is therefore twice as high in the tooth tip region 41 as in the flank regions that are at an angle of 45° from the longitudinal center axis. In the profile shaft milling cutter 1 and with a feed direction that is vertical to the plane of the drawing in FIG. 7, this means that the number of cutting edges defined by the cutting edges 34', 34 located crosswise to the feed direction is greater, or in other words twice as great, as the number of cutting edges of the main cutting edges 28', 29 located at an acute angle to the feed direction.

The chip form shown in idealized form and schematically, in FIG. 7a is thus obtained. The chip 42 has different strengths with respect to the feed direction 43 represented by an arrow in FIG. 7a. In the tooth tip region 41, the chip strength S is markedly less than in the tooth flank region. In the tooth flank region, the chip strength S is equivalent to the feed per revolution, while the chip strength S in the tooth tip region, because of there are twice as many cutting edges, is only half the feed per revolution. The feed (per revolution) is marked f in FIG. 7a.

In the tooth tip region, the chip thickness D matches the chip D strength S. In the tooth flank region, the chip thickness D is an angular projection of the chip strength S. Hence in the flank region, the chip thickness D is less and the chip strength S is greater. As a result, the chip thickness D in the tooth tip region 41 and the chip thickness D in the tooth flank region are approximately equal to one another. This evens out the wear of the cutting edges, that is, the cutting edges 34', 28' which is essentially determined by the chip thickness D. Increased wear in the tooth tip region does not occur. The same is true for the indexable cutting bit 27.

The chip shown in FIG. 7a is substantially flat and hence flexible. A very good chip formation is attained as a result. This is achieved by the character of the cutting edge geometry, which involve keeping the number of cutting edges for cutting edges that are located at an acute angle to the feed direction 43, less than the number of cutting edges of cutting edges that work at a comparatively larger angle (crosswise) to the feed direction 43. This is true for both straight and curved cutting edges.

Coaxially to the longitudinal center axis 11, the tool body 5 is penetrated by a coolant conduit 44, which extends through the indexable insert carrier portion 9 to the machining locations, that is, into the chip spaces 22, and thus to the indexable cutting bits 27, 27'.

OPERATION

The profile shaft milling cutter 1 described thus far functions as follows:

To form the grooves 2 in a turbine rotor 3, of the kind schematically shown in FIG. 10, the appropriate blank is first received on a indexing apparatus. By means of a disk milling cutter 46, schematically shown in FIG. 8, an undercut-free groove 2' is opened in the portions 4 of the turbine rotor 3, portions of which are shown in cross section in FIG. 8. The disk milling cutter 46 equipped with indexable cutting bits 47 revolves around an axis of rotation 48, and once it has been adjusted to the desired depth in the direction of the arrow 49, it is guided through the portion 4 in a feed motion longitudinally of the desired groove. In this process, the disk milling cutter 46 creates the stepped groove 2' shown in FIG. 8, whose profile is determined by the farthest-inward-producing ribs 12a–12d of the groove profile to be formed.

After the opening of the groove 2', the profile shaft milling cutter 1 is positioned for performing a preliminary fine cutting step, of the kind shown in FIG. 2, or in other words between two portions 4 of the turbine rotor 3 in such a way that its longitudinal center axis 11 coincides with the radial direction of the workpiece and it is symmetrical with a preopened groove 2' before the end thereof. In a feed motion oriented longitudinally of the groove to be formed, the rotating profile shaft milling cutter 1 is guided through the groove 2 (FIG. 2), in the process of which, as shown in FIG. 9, it mills the lateral undercut indentations 13a–13d and 13'a–13'd into the roughly preopened groove 2'. This is done in the manner shown in FIG. 7, with a substantially constant oversize A from the desired contour 51 of the finished groove 2, both in the tooth flank region and in the tooth tip region 41. Because of the larger number of cutting edges in the tooth tip region 41 in comparison with the numbers of cutting surfaces in the tooth flank regions, the chip depth D at the active cutting edges 28, 29, 34 of each indexable cutting bit 27 is substantially equalized or constant, and as a result there is no increased tooth load especially in the tooth tip region 41. The feed speed can therefore be maximized without overloading the tooth tips. Values of up to 180 mm per minute can be attained, which is a multiple of the maximum feed attainable with HSS milling cutters. Even HSS milling cutters with a wear- reducing coating enable a feed of only 80 mm per minute at most.

In a final machining step, a fine cutting is performed, in which the constant oversize A is removed down to the contour 51 by means of a HSS milling cutter. This tool need merely provide a relatively low material removal performance; because of the constant oversize A, wear can be kept constant over the length of its cutting surfaces. The only slight removal of material required by the HSS milling cutter enables a high feed speed in fine cutting, so that by means of the two-stage machining with preliminary fine cutting finish and final fine or finish cutting, first with the profile shaft milling cutter 1 equipped with indexable cutting bits and the ensuing fine cutting operation with a HSS milling cutter, a very short machining time is attainable. It is substantially shorter than in machining of the preopened groove 2' with a HSS milling cutter only.

If needed, the oversize A in the tooth tip region 41 can be made smaller during preliminary fine cutting of the groove 2 with the profile shaft milling cutter 1 than the oversize A in the remainder of the groove. This protects the tooth tips of the HSS profile shaft milling cutter in finish fine cutting or enables a higher feed speed for the tool.

Because of the symmetry, visible in FIG. 4, of the indexable cutting bits 27, main and corner cutting edges 28-1, 29-1, 34-1 that are worn down can be replaced by cutting edges 28-2, 29-2, 34-2 that are still dimensionally accurate, by loosening the particular indexable cutting bit 27 from its plate seat, rotating it 180° about its center axis 32, and re-securing it to the applicable plate seat 18, 25. The indexable cutting bits 27 can also be exchanged for one another. This assures that in the preliminary fine cutting, a fixed, uniform profile will be produced. In contrast to this, the profile form in frequent regrinding of HSS profile shaft milling cutters varies because of the resultant change in geometry of the milling cutter. Moreover, changing indexable cutting bits is simpler and takes less time that the otherwise required regrinding operation.

If needed, the indexable cutting bits 27d can differ in shape from the other indexable cutting bits, for instance to be able to machine grooves that are not as wide near the bottom.

In the production of rotor grooves, between the usual undercut-free opening of the groove by means of a disk milling cutter and the profile milling by means of a HSS profile shaft milling cutter, a preliminary fine cutting operation is carried out, in which the profile form is premachined with a profile shaft milling cutter equipped with indexable cutting bits. The profile shaft milling cutter used for the purpose is distinguished in that for instance at its radially outer tooth tips, it has a larger number of cutting surfaces than on its oblique tooth flanks. Moreover, the cutting surfaces defined by overlap in the circumferential direction of the cutting edges of the indexable cutting bits are interrupted, so that substantially flat and stiff chips are produced.

The milling cutter 1, in the preliminary fine cutting rotates about its axis 11.

Various changes and modifications can be made within the scope of the inventive concept.

I claim:

1. A workpiece material removal tool (1) for simultaneous machining or production of surfaces that form angles with one another, comprising:
    a tool body (5) rotatable about a longitudinal center axis (11);
    at least first, second and third cutting edges (28', 34, 34') formed on cutting inserts (27, 27'), the cutting inserts being secured on the tool body (5), wherein said cutting edges, upon a rotation of the tool body (5) about its longitudinal center axis (11), define a theoretical body of rotation whose contour matches a contour of the workpiece surfaces to be machined, and at least said first and second cutting edges (28', 34) forming first and second surfaces on the workpiece, said first and second surfaces defining respective first and second different angles with respect to the longitudinal center axis (11), the first angle being larger than the second angle; and
    wherein the second and third cutting edges (34, 34') form a common surface corresponding to the second surface and the second angle, the number of cutting edges which form the common surface being greater than the number of cutting edges (28') which form the first surface corresponding to the first angle.

2. The tool of claim 1, characterized in that the active cutting edges (28', 34, 34'), in their projection in the circumferential direction, define cutting surfaces that deviate from the rectilinear form.

3. The tool of claim 2, characterized in that the cutting surface form has at least two rectilinear portions that are at an angle other than 180° from one another.

4. The tool of claim 2, characterized in that the cutting surface form has at least three rectilinear portions, which are, in pairs, at an angle other than 180° from one another.

5. The tool of claim 2, characterized in that the shape of the cutting surface defines first portions (34) located parallel to the longitudinal center axis (11) and second portions (28', 29) located at an acute angle to the longitudinal center axis (11).

6. The tool of claim 5, characterized in that the number of cutting edges of the first cutting edge portions (34, 34') located parallel to the longitudinal center axis (11) is greater than the number of cutting edges of the second cutting edge portions (28', 29) located at acute angle to the longitudinal center axis (11).

7. The tool of claim 6, it characterized in that the number of cutting edges of the first cutting edges portions (34, 34') located parallel to the longitudinal center axis (11) is twice as great as the number of second cutting edges of the cutting edge portions (28'; 29) located at acute angle to the longitudinal center axis (11).

8. The tool of claim 7, characterized in that the number of cutting surfaces of the first cutting edges portions (34, 34') located parallel to the longitudinal center axis (11) is two, and that the number of cutting edges of the second cutting edge portions (28', 29) located at an acute angle to the longitudinal center axis (11) is one.

9. The tool of claim 1, characterized in that the cutting inserts (27) are indexable cutting bits.

10. The tool of claim 9, characterized in that insert plate seats (18, 25) for the indexable cutting bits (27) are formed on the tool body (5); and releasable securing means are provided securing the indexable cutting inserts (27) on said seats by said releaseable securing means.

11. The tool of claim 9, characterized in that the indexable cutting bits (27) are located such that only a single main cutting edge (28' or 29) and one corner cutting edge (34', 34) adjoining it is active on each indexable cutting bit (27).

12. The tool of claim 11, characterized in that the cutting surfaces defined by the cutting edges (28', 34'; 34, 29) of the indexable cutting bits (27) are subdivided in portions; and that the indexable cutting bits (27) whose active cutting edges (28', 34'; 34, 39) define adjacent portions of the cutting surface are formed identically to one another.

13. The tool of claim 9, characterized in that the cutting surfaces defined by the cutting edges (28', 34'; 34, 29) of the indexable cutting bits (27) are subdivided in portions.

14. The tool of claim 9, characterized in that the indexable cutting bits (27) and their plate seats (18, 25) are arranged in a spiral or helical line.

15. The tool of claim 9, characterized in that each indexable cutting bit (27) is assigned its own chip space (22).

16. The tool of claim 15, characterized in that the chip spaces (22) assigned to said cutting bits (27) are separated from one another.

17. The tool of claim 15, characterized in that reinforcing ribs (23) are formed on the tool body (5) between the chip spaces (22) of adjacent indexable cutting bits (27).

18. The workpiece material removal tool of claim 1, characterized in that the tool body (5) is provided with conduits (12) for supplying coolant.

19. A workpiece material removal tool (1) for simultaneous machining or production of surfaces that form an angle with one another, comprising:

a tool body (5) rotatable about a longitudinal center axis (11);

at least first, second and third cutting edges (28', 34, 34') formed on cutting inserts (27, 27'), the cutting inserts being secured on the tool body (5), wherein said cutting edges, upon a rotation of the tool body (5) about its longitudinal center axis (11), define a theoretical body of rotation whose contour matches a contour of the workpiece surfaces to be machined, and at least said first and second cutting edges (28', 34) forming first and second surfaces on the workpiece, said first and second surfaces corresponding to respective first and second different angles on the workpiece with respect to a feed direction (43), the first angle being larger than the second angle; and wherein the number of cutting edges (28') that form the second, smaller angle is less than the number of cutting edges (34, 34') that form the first, larger angle with the feed direction (43).

20. The tool of claim 19, characterized in that the active cutting edges (28', 34, 34'), in their projection in the circumferential direction, define a cutting line that deviates from the rectilinear form.

21. The tool of claim 20, characterized in that the cutting edges define a cutting line with at least two rectilinear portions that are at an angle other than 180° from one another.

22. The tool of claim 20, characterized in that the cutting edges define a cutting line with at least three rectilinear portions, which are, in pairs, at an angle other than 180° from one another.

23. The tool of claim 20 characterized in that the shape defined by the cutting edges defines first portions (34) located parallel to the longitudinal center axis (11) and second portions (28', 29) located at an acute angle to the longitudinal center axis (11).

24. The tool of claim 23, characterized in that the number of cutting edges of the first cutting edge portions (34, 34') located parallel to the longitudinal center axis (11) is greater than the number of cutting edges of the second cutting edge portions (28; 29) located at acute angle to the longitudinal center axis (11).

25. The tool of claim 24, characterized in that the number of cutting edges of the first cutting edges portions (34, 34') located parallel to the longitudinal center axis (11) is twice as great as the number of second cutting edges of the cutting edge portions (28; 29) located at acute angle to the longitudinal center axis (11).

26. The tool of claim 25, characterized in that the number of cutting surfaces of the first cutting edges portions (34, 34') located parallel to the longitudinal center axis (11) is two, and that the number of cutting edges of the second cutting edge portions (28', 29) located at an acute angle to the longitudinal center axis (11) is one.

27. The workpiece material removal tool of claim 19, characterized in that the tool body (5) is provided with conduits (12) for supplying coolant.

* * * * *

UNITED STATES PATENT AND TRADEMARK OFFICE
CERTIFICATE OF CORRECTION

PATENT NO.    : 5,931,616
DATED         : August 3, 1999
INVENTOR(S)   : Jurgen Daub It is certified that error appears in the above-identified patent and that said Letters Patent is hereby corrected as shown below:

Insert Assignee's name
-- Walter AG, Derendinger Str. 33, D-72072 Tubingen, Germany --.

Signed and Sealed this

Twenty-eighth Day of August, 2001

*Attest:*

*Attesting Officer*

NICHOLAS P. GODICI
*Acting Director of the United States Patent and Trademark Office*